Patented Feb. 20, 1923.

1,445,621

UNITED STATES PATENT OFFICE.

SIDNEY M. CADWELL, OF LEONIA, NEW JERSEY, ASSIGNOR TO THE NAUGATUCK CHEMICAL COMPANY, A CORPORATION OF CONNECTICUT.

PROCESS FOR VULCANIZING RUBBER AND PRODUCTS OBTAINED THEREBY.

No Drawing. Division of joint application of Sidney M. Cadwell and Claude D. Mason, filed April 16, 1920, Serial No. 374,275. Divided and this application filed November 16, 1920. Serial No. 424,456.

*To all whom it may concern:*

Be it known that I, SIDNEY M. CADWELL, a citizen of the United States, residing at Leonia, county of Bergen, State of New Jersey, have invented certain new and useful Improvements in Processes for Vulcanizing Rubber and Products Obtained Thereby, of which the following is a full, clear, and exact description.

This case is a division of Serial No. 374,- 275, application of Cadwell and Mason, filed April 16, 1920.

This invention relates to processes for vulcanizing rubber and products obtained thereby. It is more particularly directed to the process for vulcanizing rubber in the presence of an organic accelerator and products obtained thereby.

It is known that the time and temperature involved in the vulcanization of rubber as heretofore practiced may be regulated by the use of accelerators. The class of accelerators which has been employed in the more recent processes has included the organic accelerators and of these organic accelerators the amies and their derivatives have provided perhaps the most promising group. Of these amine derivatives the carbon disulphide derivatives have constituted the faster accelerators. Among these faster accelerators aliphatic amine carbon disulphide derivatives have appeared most promising. One disadvantage of such aliphatic amine accelerators has been that the raw materials from which they are produced are expensive and must be used in a relatively high state of purity in order to avoid the occurrence in the finished accelerator of objectionable by-products.

The object of the present invention accordingly is to provide an efficient process comprising an eccelerator which may be made from relatively inexpensive raw materials and materials which in many instances may be employed in a relatively impure condition without the presence of objectionable by-products. Another object of the invention is to provide a simple process of vulcanization comprising an eccelerator in sufficient quantity and for a length of time to provide an optimum vulcanization. Another object of the invention is to provide a process of the kind described employing an accelerator free from odor, and poisonous characteristics. Another object of the invention is to provide a series of products having improved physical characteristics in general, and also the product from a process such as that outlined above.

The invention accordingly consists of a process for vulcanizing rubber or similar material which comprises combining therewith a vulcanizing agent and a material comprising thiuramdisulphide containing substituted alkyl and aryl groups and vulcanizing the rubber. In carrying out the invention in its preferred form 100 parts of rubber, 10 parts of zinc oxide, 3 parts of sulphur and $\frac{1}{10}$ part dimethyldiphenylthiuramdisulphide are mixed on the mill at the ordinary temperature and for the usual time, when mixing is accomplished, and the material is vulcanized for 10 minutes or longer under 40 lbs. steam pressure. The preferred method of preparation of this accelerator namely, dimethyldiphenylthiuramdisulphide, is as follows: 480 parts monomethylaniline, 170 parts carbon disulphide and 285 parts iodine dissolved in alcohol are mixed and allowed to stand. The product which is formed crystallizes out after about two hours standing and is filtered, washed with a little alcohol, and air dried. It is believed that this compound has the following formula:

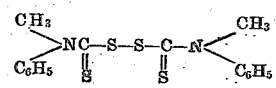

Diphenyldimethylthiuramdisulphide, a representative of a class of similar compounds which may be employed in accelerating vulcanization, and among these substances may be mentioned the following:

Diethyldiphenylthiuramdisulphide:

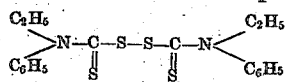

Diparamethylphenylenedimethylthiuramdisulfide

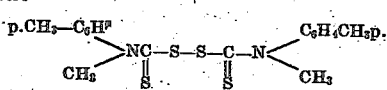

It will be noted that in employing vari s members of the group as given above ti t vulcanization may be accomplished in a mold or in open heat or in any other desired manner.

The vulcanized rubber obtained as a result of the process herein set forth is substantially odorless and colorless. It possesses excellent physical characteristics such as good tensile strength, resistance to flexing and abrasion, and excellently withstands the usual ageing tests. The quantity of sulphur employed for securing optimum vulcanization may be so small when used with accelerators of the type herein described that blooming is substantially avoided.

It will thus be seen that among others the objects heretofore noted have been achieved.

As many apparently widely different embodiments of this invention may be made without departing from the spirit thereof, it will be understood that we do not intend to limit ourselves to the specific embodiment herein set forth except as indicated in the appended claims.

Having thus described my invention, what I claim and desire to protect by Letters Patent is:

1. The process for vulcanizing rubber or similar material which comprises combining therewith a vulcanizing agent and a material comprising thiuramdisulphide containing substituted alkyl and aryl groups, and vulcanizing the rubber.

2. A vulcanized rubber compound derived from rubber combined with a vulcanizing agent and a thiuramdisulphide containing substituted alkyl and aryl groups.

3. The process for vulcanizing rubber or similar material which comprises combining rubber with a vulcanizing agent and diphenyldimethylthiuramdisulphide and vulcanizing the rubber.

Signed at New York city, this 11 day of November 1920.

SIDNEY M. CADWELL.